US011516892B2

(12) United States Patent
Nagaoka et al.

(10) Patent No.: US 11,516,892 B2
(45) Date of Patent: Nov. 29, 2022

(54) TRANSPORTATION APPARATUS AND VEHICLE

(71) Applicant: HONDA MOTOR CO., LTD., Tokyo (JP)

(72) Inventors: Nobuharu Nagaoka, Wako (JP); Shintaro Ohtaki, Wako (JP); Masaki Nakajima, Wako (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 293 days.

(21) Appl. No.: 16/892,607

(22) Filed: Jun. 4, 2020

(65) Prior Publication Data
US 2020/0389945 A1 Dec. 10, 2020

(30) Foreign Application Priority Data

Jun. 10, 2019 (JP) .............................. JP2019-108221

(51) Int. Cl.
| H05B 3/86 | (2006.01) |
| B60R 11/04 | (2006.01) |
| B60J 1/02 | (2006.01) |
| B60J 1/00 | (2006.01) |

(52) U.S. Cl.
CPC .............. H05B 3/86 (2013.01); B60J 1/002 (2013.01); B60J 1/02 (2013.01); B60R 11/04 (2013.01)

(58) Field of Classification Search
CPC ... B60J 1/002; B60J 1/02; B60R 11/04; B60S 1/0848; H05B 3/84; H05B 3/86
See application file for complete search history.

(56) References Cited

U.S. PATENT DOCUMENTS

| 6,492,619 B1 * | 12/2002 | Sol ..................... B32B 17/10229 |
| | | 52/171.2 |
| 6,559,419 B1 * | 5/2003 | Sol .......................... H05B 3/86 |
| | | 52/171.2 |
| 6,734,396 B2 * | 5/2004 | Sol .......................... H05B 3/84 |
| | | 52/171.2 |
| 7,223,940 B2 * | 5/2007 | Voeltzel ............ B32B 17/10174 |
| | | 428/630 |
| 7,731,373 B2 * | 6/2010 | Oskarsson ........ B32B 17/10036 |
| | | 219/203 |

(Continued)

FOREIGN PATENT DOCUMENTS

| JP | 2014-37344 A | 2/2014 |
| JP | 2018-34522 A | 3/2018 |

OTHER PUBLICATIONS

Office Action dated Mar. 18, 2022, issued in counterpart JP application No. 2019-108221, with partial English translation. (3 pages).

Primary Examiner — Jason Crawford
(74) Attorney, Agent, or Firm — WHDA, LLP (57) ABSTRACT

A transportation apparatus includes: a window member; a first heating unit arranged to heat a first region of the window member; a second heating unit arranged to heat a second region of the window member; and a control unit configured to control driving of the first heating unit and the second heating unit. The first region and the second region are adjacent regions. The control unit performs first heating control of making a heating output of the first heating unit larger than a heating output of the second heating unit.

8 Claims, 6 Drawing Sheets

(56) References Cited

U.S. PATENT DOCUMENTS

| | | | |
|---|---|---|---|
| 8,383,988 B2 | 2/2013 | Grunert et al. | |
| 9,395,538 B2* | 7/2016 | Hui | G02B 27/0006 |
| 10,479,287 B2* | 11/2019 | Sliwa | B60S 1/02 |
| 10,814,786 B2* | 10/2020 | Ohtaki | G07C 5/0808 |
| 10,928,629 B2* | 2/2021 | Ohsumi | G03B 30/00 |
| 11,007,980 B2 | 5/2021 | Oikawa | |
| 11,097,691 B2* | 8/2021 | Kovach | B60R 11/04 |
| 11,285,779 B2* | 3/2022 | Kudo | B60H 1/2227 |
| 2016/0006911 A1* | 1/2016 | Kimura | G03B 17/55 |
| | | | 348/47 |
| 2016/0119509 A1* | 4/2016 | Wato | B60R 11/04 |
| | | | 348/148 |
| 2017/0064175 A1* | 3/2017 | Furutake | G02B 3/02 |
| 2017/0334364 A1* | 11/2017 | Usami | B60R 11/04 |
| 2017/0334366 A1* | 11/2017 | Sliwa | B60S 1/56 |
| 2017/0347405 A1* | 11/2017 | Nagae | H05B 3/84 |
| 2018/0056942 A1* | 3/2018 | Oikawa | B60S 1/586 |
| 2018/0213610 A1* | 7/2018 | Futatsugi | B60S 1/0848 |
| 2019/0031116 A1* | 1/2019 | Bulgajewski | H05B 3/84 |
| 2019/0100158 A1* | 4/2019 | Wato | B60R 11/04 |
| 2020/0389945 A1* | 12/2020 | Nagaoka | B60J 1/002 |
| 2021/0092803 A1* | 3/2021 | Kasetani | H05B 3/34 |
| 2021/0229635 A1 | 7/2021 | Oikawa | |

* cited by examiner

TRANSPORTATION APPARATUS AND VEHICLE

CROSS-REFERENCE TO RELATED APPLICATION

This application claims priority to and the benefit of Japanese Patent Application No. 2019-108221 filed on Jun. 10, 2019, the entire disclosure of which is incorporated herein by reference.

BACKGROUND OF THE INVENTION

Field of the Invention

The present invention relates to a transportation apparatus and a vehicle.

Description of the Related Art

There is known a vehicle provided with a heating device configured to heat a window member to prevent fogging of the window member that constitutes a windshield or the like. Japanese Patent Laid-Open No. 2014-37344 discloses a technique of providing a plurality of heating units on a windowpane.

If the heating target regions of a plurality of heating devices are adjacent on a window member, heat of one heating device influences the heating target region of another heating device. When the heating devices are driven together, each heating target region may unnecessarily be heated.

SUMMARY OF THE INVENTION

It is an object of the present invention to provide a technique of more appropriately heating a plurality of heating target regions on a window member.

According to an aspect of the present invention, there is provided a transportation apparatus comprising: a window member; a first heating unit arranged to heat a first region of the window member; a second heating unit arranged to heat a second region of the window member; and a control unit configured to control driving of the first heating unit and the second heating unit, wherein the first region and the second region are adjacent regions, and the control unit performs first heating control of making a heating output of the first heating unit larger than a heating output of the second heating unit.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 1:
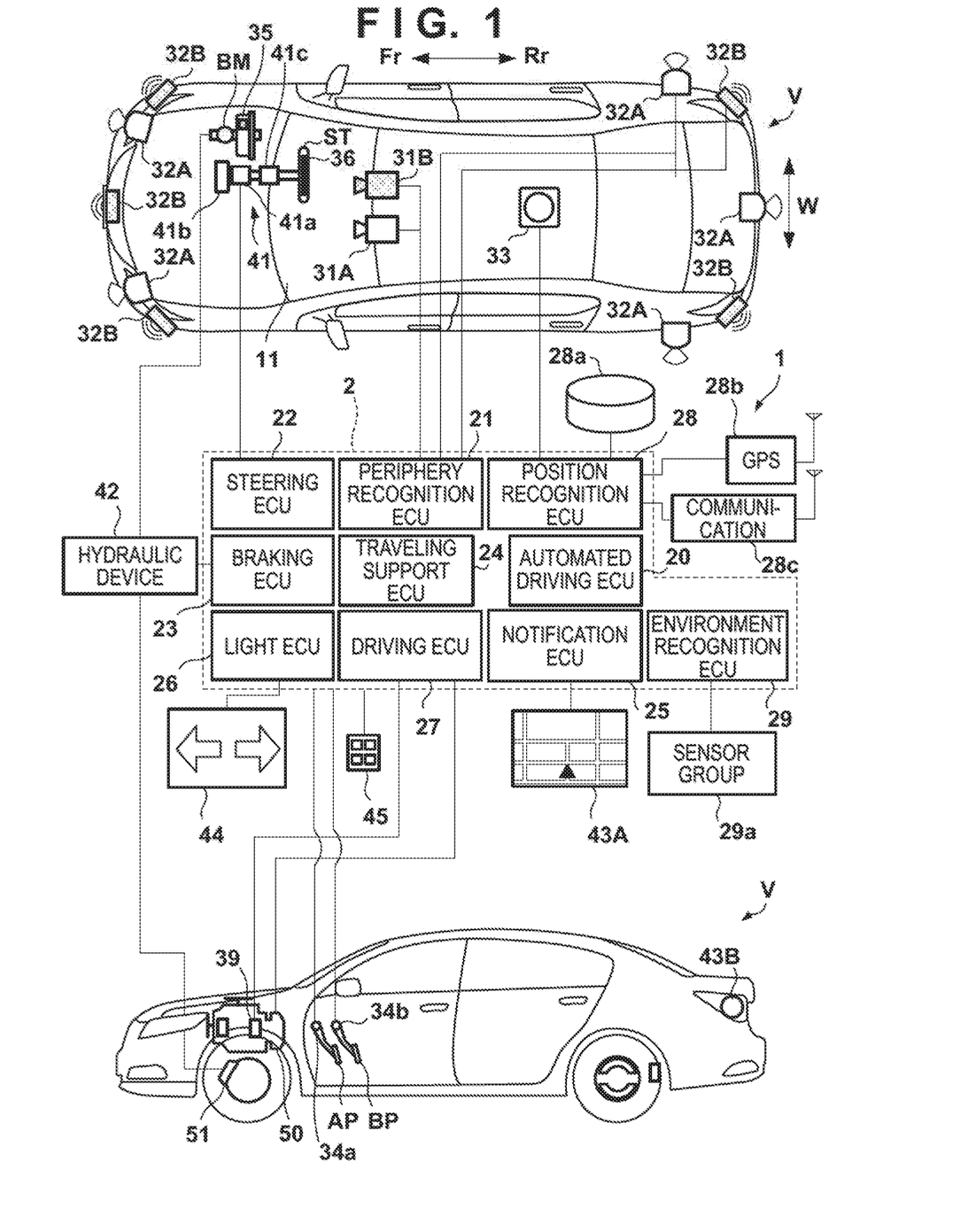
FIG. 1 is a block diagram of a vehicle and a control apparatus thereof according to an embodiment.

FIG. 1 is a block diagram of a vehicle V and a control apparatus 1 thereof according to an embodiment of the present invention. The control apparatus 1 controls the vehicle V. FIG. 1 shows the schematic arrangement of the vehicle V in a plan view and a side view. As an example, the vehicle V is a sedan-type four-wheeled passenger car. In FIG. 1, Fr indicates the front side of the vehicle V in the front-and-rear direction, and Rr indicates the rear side. An arrow W indicates the vehicle width direction.

The vehicle V according to this embodiment is, for example, a parallel-type hybrid vehicle. In this case, a power plant 50 configured to output a driving force to rotate the driving wheels of the vehicle V can be formed from an internal combustion engine, a motor, and an automatic transmission. The motor can be used as a driving source configured to accelerate the vehicle V and can also be used as a power generator at the time of deceleration or the like (regenerative braking).

<Control Apparatus 1>

The arrangement of the control apparatus 1 will be described with reference to FIG. 1. The control apparatus 1 includes an ECU group (control unit group) 2. The ECU group 2 includes a plurality of ECUs 20 to 29 configured to be communicable with each other. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIG. 1, the names of the representative functions of the ECUs 20 to 29 are given. For example, the ECU 20 is denoted by "automated driving ECU".

The ECU 20 executes control concerning automated driving as traveling control of the vehicle V. In the automated driving, at least one of acceleration/deceleration, steering, and braking of the vehicle V is automatically performed without depending on a driving operation of a driver. In this embodiment, driving, steering, and braking are automatically performed.

The ECU 21 is a periphery recognition unit configured to recognize the traveling situation of the vehicle V based on the detection results of detection units 31A, 31B, 32A, and 32B that detect the peripheral situation of the vehicle V, and recognizes, for example, a target existing on the periphery of the vehicle V.

In this embodiment, the detection units 31A and 31B are cameras (to be sometimes referred to as the camera 31A and the camera 31B hereinafter) configured to capture the front side of the vehicle V. and are attached to the windshield inside the vehicle cabin at the roof front of the vehicle V. When images captured by the cameras 31A and 31B are analyzed, the contour of a target or a division line (a white line or the like) of a lane on a road can be extracted.

Figure 2A:
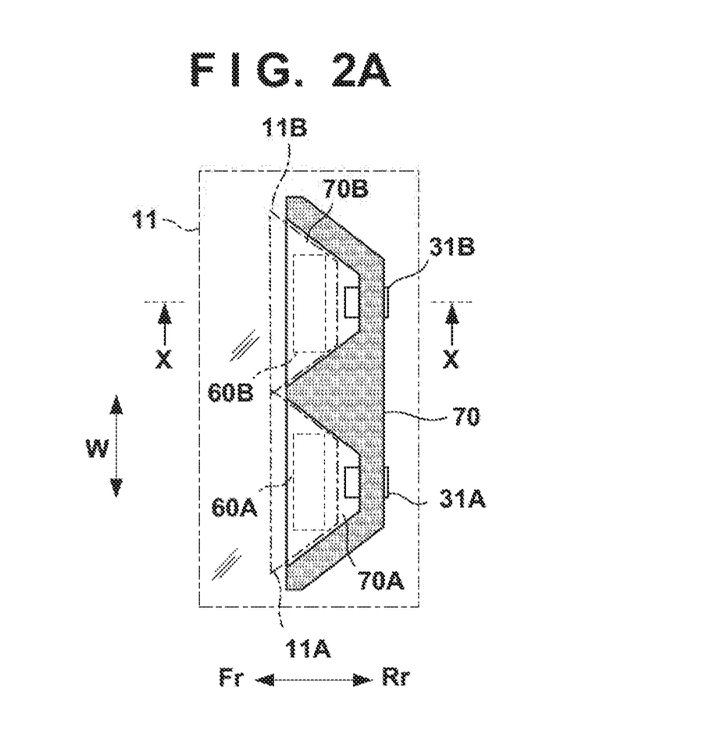
FIG. 2A is a plan view showing the arrangement form of detection units.
Figure 2B:
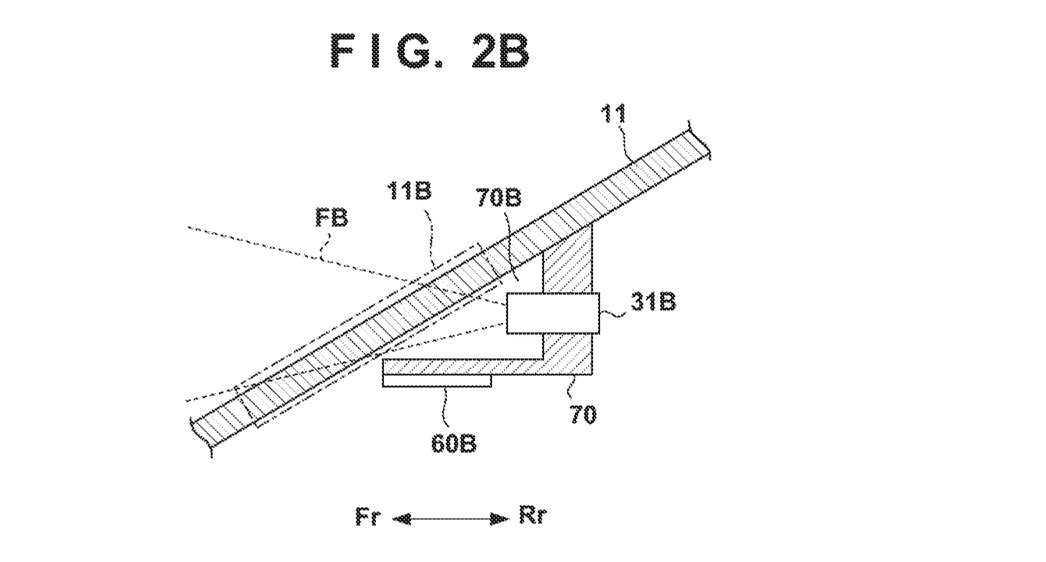
FIG. 2B is a sectional view taken along a line X-X in FIG. 2A.

FIG. 2A is a plan view showing the arrangement form of the cameras 31A and 31B, and FIG. 2B is a sectional view taken along a line X-X in FIG. 2A and shows the attachment structure of the cameras 31A and 31B to a window member 11 that constitutes a windshield. FIG. 2B shows the sectional structure near the camera 31B, and the sectional structure near the camera 31A is the same as this.

The cameras 31A and 31B are fixed to the window member 11 via a bracket 70. The window member 11 is, for example, a transparent glass plate, and the bracket 70 is fixed to the surface of the window member 11 on the cabin side by an adhesive or the like. The cameras 31A and 31B are juxtaposed in the vehicle width direction indicated by the arrow W. Spaces 70A and 70B surrounded by the bracket 70 and the window member 11 are formed so the bracket 70 does not interfere with image capturing ranges FB of the cameras 31A and 31B. The space 70A corresponds to the camera 31A, and the space 70B corresponds to the camera 31B. The spaces 70A and 70B communicate with the vehicle cabin at the lower portion of the bracket 70, and air circulation is possible between the spaces 70A and 70B and the vehicle cabin.

The window member 11 is located on the image capturing ranges FB of the cameras 31A and 31B. A region 11A is a region on the window member 11, which overlaps the image capturing range of the camera 31A, and a region 11B is a region on the window member 11, which overlaps the image capturing range of the camera 31B. The regions 11A and 11B are regions adjacent to each other, and in this embodiment, are adjacent in the vehicle width direction. The regions 11A and 11B may partially overlap or may be spaced apart from each other.

When fogging or freezing occurs in the region 11A or 11B, the quality of images captured by the cameras 31A and 31B may lower. To avoid this, heaters 60A and 60B are provided. In this embodiment, the heaters 60A and 60B are heating wires that generate heat by energization. In the heating wire, the magnitude of the heating output is, for example, the magnitude of power (W) supplied to the heating wire.

The heater 60A corresponds to the camera 31A and the region 11A, and the heater 60B corresponds to the camera 31B and the region 11B. The heater 60A is arranged to heat the region 11A. When the heater 60A is operated, the periphery of the heater, including air in the spaces 70A, is heated by heat. Hence, fogging in the region 11A of the window member 11 can be reduced, or deicing can be performed. Similarly, the heater 60B is arranged to heat the region 11B. When the heater 60B is operated, the periphery of the heater, including air in the spaces 70B, is heated by heat. Hence, fogging in the region 11B of the window member 11 can be reduced, or deicing can be performed.

Since the region 11A and the region 11B are adjacent, heat generation of the heater 60A acts on beating of the region 11B as well. Similarly, heat generation of the heater 60B acts on heating of the region 11A as well.

The heaters 60A and 60B are supported by the bracket 70, and in the illustrated example, attached to the bottom portion of the bracket 70. The heaters 60A and 60B may be provided on the window member 11 that is the heating target. However, when these are provided on the bracket 70, as in this embodiment, that contributes to visibility securing for an occupant or convenience of wiring. Driving of the heaters 60A and 60B is controlled by the ECU 21.

Referring back to FIG. 1, in this embodiment, the detection unit 32A is a LiDAR (Light Detection and Ranging)(to be sometimes referred to as the LiDAR 32A hereinafter), and detects a target around the vehicle V or measures the distance to a target. In this embodiment, five LiDARs 32A are provided; one at each corner of the front portion of the vehicle V, one at the center of the rear portion, and one on each side of the rear portion. The detection unit 32B is a millimeter wave radar (to be sometimes referred to as the radar 32B hereinafter), and detects a target around the vehicle V or measures the distance to a target. In this embodiment, five radars 32B are provided; one at the center of the front portion of the vehicle V, one at each corner of the front portion, and one at each corner of the rear portion.

The ECU 22 is a steering control unit configured to control an electric power steering device 41. The electric power steering device 41 includes a mechanism that steers the front wheels in accordance with the driving operation (steering operation) of the driver on a steering wheel ST. The electric power steering device 41 includes a driving unit 41a including a motor that generates a driving force to assist the steering operation or automatically steer the front wheels, a steering angle sensor 41b, a torque sensor 41c that detects the steering torque on the driver, and the like. In addition, the ECU 22 can acquire the detection result of a sensor 36 that detects whether the driver is gripping the steering wheel ST, and can monitor the gripping state of the driver.

The ECU 23 is a braking control unit configured to control a hydraulic device 42. A braking operation of the driver on a brake pedal BP is converted into a fluid pressure by a brake master cylinder BM and transmitted to the hydraulic device 42. The hydraulic device 42 is an actuator capable of controlling, based on the fluid pressure transmitted from the brake master cylinder BM, the fluid pressure of hydraulic oil to be supplied to a brake device (for example, a disc brake device) 51 provided in each of the four wheels. The ECU 23 performs driving control of a solenoid valve and the like provided in the hydraulic device 42. The ECU 23 can light a brake lamp 43B at the time of braking. This can increase the attention of a following vehicle to the vehicle V.

The ECU 23 and the hydraulic device 42 can form an electric servo brake. The ECU 23 can control, for example, the distribution of a braking force by the four brake devices 51 and a braking force by regenerative braking of the motor provided in the power plant 50. The ECU 23 can also implement an ABS function, traction control, and the posture control function for the vehicle V based on the detection results of a wheel speed sensor 38 provided in each of the four wheels, a yaw rate sensor (not shown), and a pressure sensor 35 configured to detect the pressure in the brake master cylinder BM.

The ECU 24 is a traveling support unit that executes control concerning traveling support (In other words, driving support) as traveling control of the vehicle V based on the detection results of the detection units 31A and 32A. As the contents of the traveling support, the ECU 24 can execute, for example, control of collision mitigation braking, lane departure suppression, and the like. In the collision mitigation braking, if the possibility of collision against an obstacle on the front side is high, the ECU 23 is instructed to operate the brake devices 51, thereby supporting collision avoidance. In the lane departure suppression, if the possibility of lane departure of the vehicle V is high, the ECU 22 is instructed to operate the electric power steering device 41, thereby supporting lane departure avoidance.

In both automated driving and manual driving, the ECU 24 executes control concerning traveling support. To do this, the ECU 24 always monitors the detection results of the detection units 31A and 32A during traveling of the vehicle V. That is, the detection units 31A and 32A are driven in both a manual driving mode and an automated driving mode to be described later, and the detection results are monitored for traveling support control.

On the other hand, the ECU 24 does not monitor the detection results of the detection units 31B and 32B. In the embodiment, the detection results of the detection units 31B and 32B are monitored only in the automated driving mode together with the detection results of the detection units 31A and 32A and used for target recognition or the like. Hence, in the manual driving mode, an arrangement that does not drive the detection units 31B and 32B can also be employed. On the other hand, the detection units 31B and 32B may be driven to prepare for target recognition or the like in the manual driving mode, although monitoring is not performed.

The ECU 25 is an in-vehicle notification control unit configured to control an information output device 43A that notifies information in the vehicle. The information output device 43A includes, for example, a head-up display or a display device provided on an instrument panel, or a voice output device. The information output device 43A may further include a vibration device. The ECU 25 causes the information output device 43A to output, for example, various kinds of information such as a vehicle speed and an atmospheric temperature, information such as a route guidance, and information concerning the state of the vehicle V.

The ECU 26 is an external notification control unit configured to control an information output device 44 that notifies information outside the vehicle. In this embodiment, the information output device 44 is a direction indicator (hazard lamp). The ECU 26 controls blinking of the information output device 44 serving as a direction indicator, thereby notifying the exterior of the vehicle of the advancing direction of the vehicle V. In addition, the ECU 26 controls blinking of the information output device 44 serving as a hazard lamp, thereby increasing the attention of the exterior to the vehicle V.

The ECU 27 is a driving control unit configured to control the power plant 50. In this embodiment, one ECU 27 is assigned to the power plant 50. However, one ECU may be assigned to each of the internal combustion engine, the motor, and the automatic transmission. The ECU 27 controls the output of the internal combustion engine or the motor or switches the gear range of the automatic transmission in correspondence with, for example, the driving operation of the driver detected by an operation detection sensor 34a provided on an accelerator pedal AP or an operation detection sensor 34b provided on the brake pedal BP, the vehicle speed, or the like. Note that as a sensor that detects the traveling state of the vehicle V, a rotation speed sensor 39 that detects the rotation speed of the output shaft of the automatic transmission is provided in the automatic transmission. The vehicle speed of the vehicle V can be calculated from the detection result of the rotation speed sensor 39.

The ECU 28 is a position recognition unit configured to recognize the current position or the course of the vehicle V. The ECU 28 performs control of a gyro sensor 33, a GPS sensor 28b, and a communication device 28c and information processing of a detection result or a communication result. The gyro sensor 33 detects the rotary motion of the vehicle V. The course of the vehicle V can be determined based on the detection result of the gyro sensor 33, and the like. The GPS sensor 28b detects the current position of the vehicle V. The communication device 28c performs wireless communication with a server configured to provide map information and traffic information, and acquires these pieces of information. A database 28a can store accurate map information. The ECU 28 can more accurately specify the position of the vehicle V on a lane based on the map information and the like.

The ECU 29 is an environment recognition unit configured to recognize an environment the vehicle V is in. The environment here includes at least one of the external environment (atmospheric temperature, humidity, weather, and the like) of the vehicle V and the internal environment (room temperature, indoor humidity, and the like) of the vehicle V. The ECU 29 recognizes the environment based on the detection result of a sensor group 29a. The sensor group 29a includes, for example, a temperature sensor, a humidity sensor, an illuminance sensor, and a rain sensor. As the temperature sensor and the humidity sensor, sensors outside the vehicle and those inside the vehicle may be provided. In addition, the ECU 29 may have a calendar function, thereby recognizing a season as the external environment of the vehicle V.

An input device 45 is arranged in the vehicle such that the driver can operate it, and accepts input of an instruction or information from the occupant.

Control Example

Selection of Moving Mode

Figure 3:
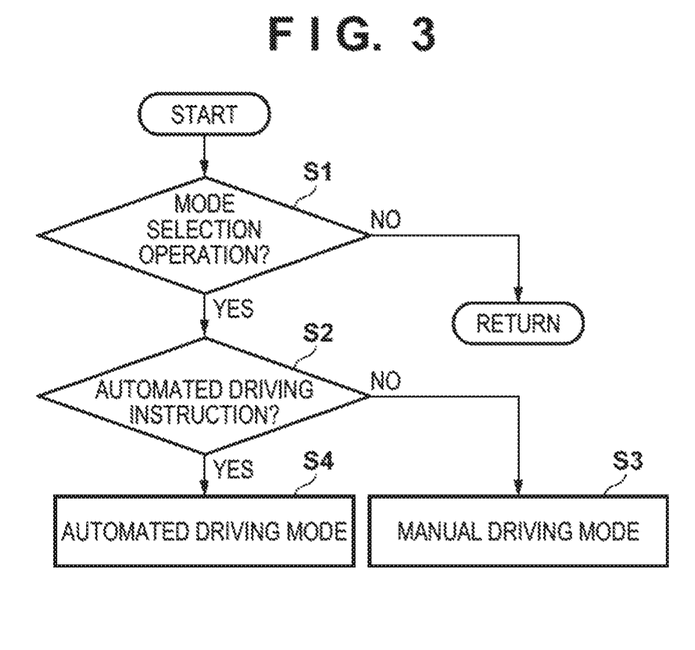
FIG. 3 is a flowchart showing an example of processing executed by the control apparatus shown in FIG. 1.

A control example of the control apparatus 1 will be described. FIG. 3 is a flowchart showing moving mode selection processing executed by the ECU 20. Moving modes according to this embodiment are traveling modes concerning automation of driving of the vehicle V. In this embodiment, the occupant can select a moving mode from a plurality of types of moving modes. In this embodiment, the plurality of types of moving modes are two types, that is, the manual driving mode and the automated driving mode.

In step S1, it is determined whether a moving mode selection operation has been done by the occupant. The occupant can instruct switching between the automated driving mode and the manual driving mode by, for example, an operation on the input device 45. If a selection operation has been done, the process advances to step S2. Otherwise, the processing is ended.

In step S2, it is determined whether the selection operation instructs automated driving. If the selection operation instructs automated driving, the process advances to step S4. If the selection operation instructs manual driving, the process advances to step S3. In step S3, the manual driving mode is set, and manual driving control is started. In step S4, the automated driving mode is set, and automated driving control is started. Current settings concerning the moving mode are notified from the ECU 20 to the ECUs 21 to 29 and recognized.

In the manual driving control, acceleration/deceleration, steering, and braking of the vehicle V are performed in accordance with the driving operation of the occupant (driver). In the automated driving control, the ECU 20 outputs control instructions to the ECUs 22, 23, and 27 to control acceleration/deceleration, steering, and braking of the vehicle V, thereby causing the vehicle V to automatically travel without depending on the driving operation of the occupant. The ECU 20 sets the traveling route of the vehicle V and makes the vehicle V travel along the set traveling route by referring to the position recognition result of the ECU 28 or a target recognition result. A target is recognized based on the detection results of the detection units 31A, 31B, 32A, and 32B.

<Driving Control of Heaters>

An example of driving control of the heaters 60A and 60B will be described. The ECU 21 can independently drive the heaters 60A and 60B. The ECU 21 drives the heaters 60A and 60B to perform defogging and antifogging in the regions 11A and 11B of the window member 11. In this embodiment, the region 11A overlaps the image capturing range of the camera 31A whose image capturing result is always monitored, and is therefore a region where defogging and antifogging are always necessary. On the other hand, the region 11B overlaps the image capturing range of the camera 31B whose image capturing result is monitored at the time of automated driving. Hence, defogging and antifogging are not always necessary as compared to the region 1A.

Figure 4:
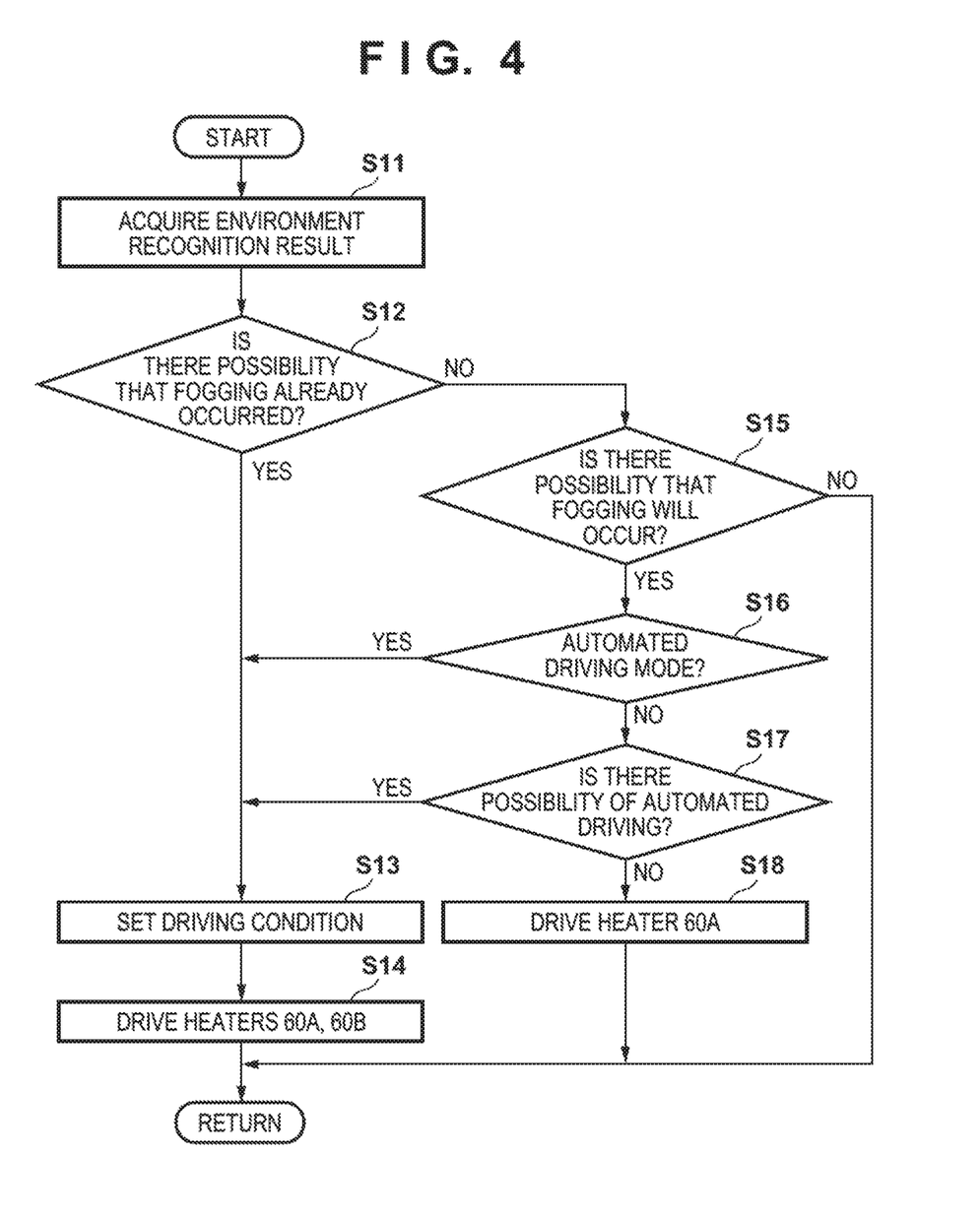
FIG. 4 is a flowchart showing an example of processing executed by the control apparatus shown in FIG. 1.

FIG. 4 is a flowchart showing an example of driving control executed by the ECU 21, and the flowchart is repetitively executed. In step S11, the ECU 21 acquires an environment recognition result from the ECU 29. In step S12, the ECU 21 determines, based on the environment recognition result acquired in step S11, whether there is a possibility that fogging has already occurred in the regions 11A and 11B. For example, if the humidity in the vehicle is equal to or more than a threshold, it is determined that there is a possibility that fogging has already occurred. Alternatively, if the atmospheric temperature outside the vehicle is equal to or less than a threshold, or if the atmospheric temperature outside the vehicle is lower than the atmospheric temperature in the vehicle by a threshold or more, it is determined that there is a possibility that fogging has already occurred.

If fogging has already occurred in the region 11A, it may affect traveling support control, and defogging should quickly be performed. For this reason, if the ECU 21 has determined in step S12 that fogging has already occurred in the regions 11A and 11B, a heating condition to heat the regions 11A and 11B is satisfied, and the process advances to step S13. In step S13, the driving conditions of the heaters 60A and 60B are set. In step S14, the ECU 21 drives the heaters 60A and 60B. Driving both the heaters 60A and 60B will sometimes be referred to as double driving hereinafter. Defogging is promoted by the double driving.

If the ECU 21 has determined in step S12 that there is no possibility that fogging has already occurred in the regions 11A and 11B, the process advances to step S15. In step S15, the ECU 21 determines, based on the environment recognition result acquired in step S11, whether there is a possibility that fogging will occur in the regions 11A and 11B. For example, if the atmospheric temperature outside the vehicle is lower than the atmospheric temperature in the vehicle by a threshold or more, it is determined that there is a possibility that fogging will occur. Alternatively, for example, if the degree of lowering of the atmospheric temperature change outside the vehicle is equal to or more than a threshold, it is determined that there is a possibility that fogging will occur. Upon determining that there is a possibility that fogging will occur, the ECU 21 advances to step S16. Upon determining that there is no possibility, the ECU 21 ends the processing.

In step S16, the ECU 21 determines whether the current moving mode setting is the automated driving mode. During setting of the automated driving mode, the process advances to step S13 to perform antifogging in both the regions 11A and 11B. If the manual driving mode is set, antifogging in the region 11B is not essential because the detection result of the camera 31B is not monitored.

Hence, the process advances to step S17, and the ECU 21 determines whether there is a possibility that the manual driving mode will be switched to the automated driving mode in a relatively short time. As for the determination of the possibility, for example, in a case in which the setting of the automated driving mode is limited to traveling on an expressway, traveling on a dedicated road, or traveling at a predetermined speed or more (auto-cruise or the like), if the vehicle is moving at a position geographically close to a region where the automated driving mode is settable, or if a region where the automated driving mode is settable is include on the guidance route, it can be determined that there is a possibility. Alternatively, it can be determined that there is a possibility by estimating, based on the history of past use forms of the vehicle V a time zone or a geographical region in which the automated driving mode is to be set.

If the ECU 21 determines that there is a possibility that the manual driving mode will be switched to the automated driving mode, the process advances to step S13 to perform antifogging in both the regions 11A and 11B. If it is determined that there is no possibility, the process advances to step S18. In step S18, the ECU 21 drives only the heater 60A. By driving only the heater 60A, antifogging can be performed for at least the region 11A. In addition, since the heater 60B is not driven, power consumption can be reduced. Driving one of the heaters 60A and 60B will sometimes be referred to as single driving hereinafter.

<Example of Driving Control of Heaters>

Figure 5A:
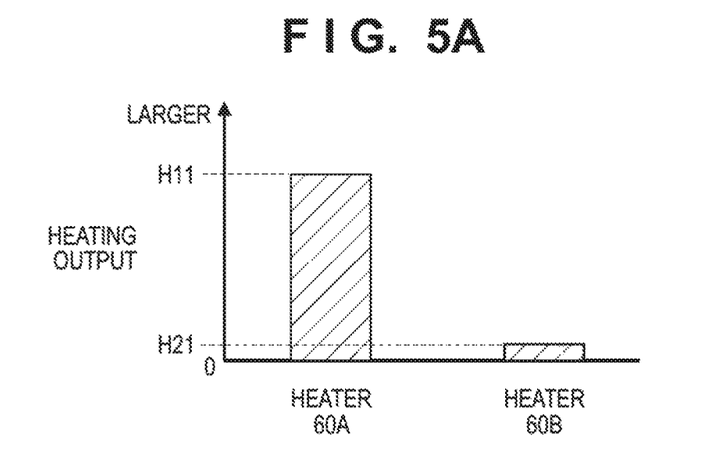
FIGS. 5A and 5B are explanatory views showing heating output examples of heaters.
Figure 5B:
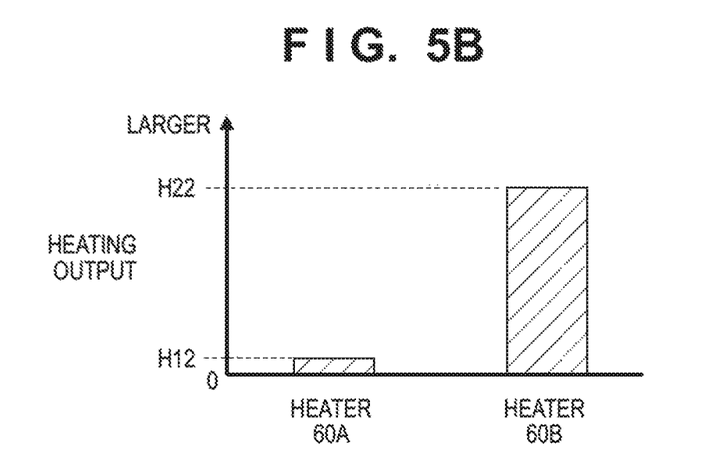

Control of heating outputs of the heaters 60A and 60B will be described. Heat generation of the heater 60A according to this embodiment affects not only the corresponding region 11A but also the region 11B, and heat generation of the heater 60B affects not only the corresponding region 11B but also the region 11A. If the heating outputs of both the heaters 60A and 60B are large, power may unnecessarily be consumed, or the regions 11A and 11B may unnecessarily abruptly be heated. In this embodiment, a plurality of types of driving control modes are provided concerning the heating outputs of the heaters 60A and 60B. FIGS. 5A and 5B show examples. An example of the driving control mode shown in FIG. 5A will be referred to as a mode A, and an example of the driving control mode shown in FIG. 5B will be referred to as a mode B. The heating outputs of the heaters 60A and 60B can be controlled by PWM control of driving signals or by switching the magnitude of a supplied voltage or a supplied current.

In the mode A, a heating output H11 of the heater 60A is larger than a heating output H21 of the heater 60B. The heating output Hi may be, for example, the rated output of the heater 60A. The heating output H21 may be 0 or an output larger than 0. If the heating output H21 is an output larger than 0, the relationship between the heating output H21 and the heating output H11 may be, for example, $0<H21 \leq H11/2$. Alternatively, it may be $0<H21 \leq H11/4$. Otherwise, $0<H21 \leq H11/8$ may hold. Alternatively, $H11/4 \leq H21 \leq H11/2$ may hold. Otherwise, $H11/8 \leq H21 \leq H11/4$ may hold. The mode A may include a plurality of sub-modes in which the magnitude of at least one of the heating output H11 and the heating output H21 is different, and one of the sub-modes may be selected in accordance with the environment recognition result (S11).

In the mode B, a heating output H12 of the heater 60A is smaller than a heating output H22 of the heater 60B. The heating output H22 may be, for example, the rated output of the heater 60B. The heating output H12 may be 0 or an output larger than 0. If the heating output H12 is an output larger than 0, the relationship between the heating output H12 and the heating output H22 may be, for example, 0<H12≤H22/2. Alternatively, it may be 0<H12≤H22/4. Otherwise, 0<H12≤H22/8 may hold. Alternatively, H22/4≤H12≤H22/2 may hold. Otherwise, H22/8≤H12≤H22/4 may hold. The mode B may include a plurality of sub-modes in which the magnitude of at least one of the heating output H12 and the heating output H22 is different, and one of the sub-modes may be selected in accordance with the environment recognition result (S11).

Figure 6A:
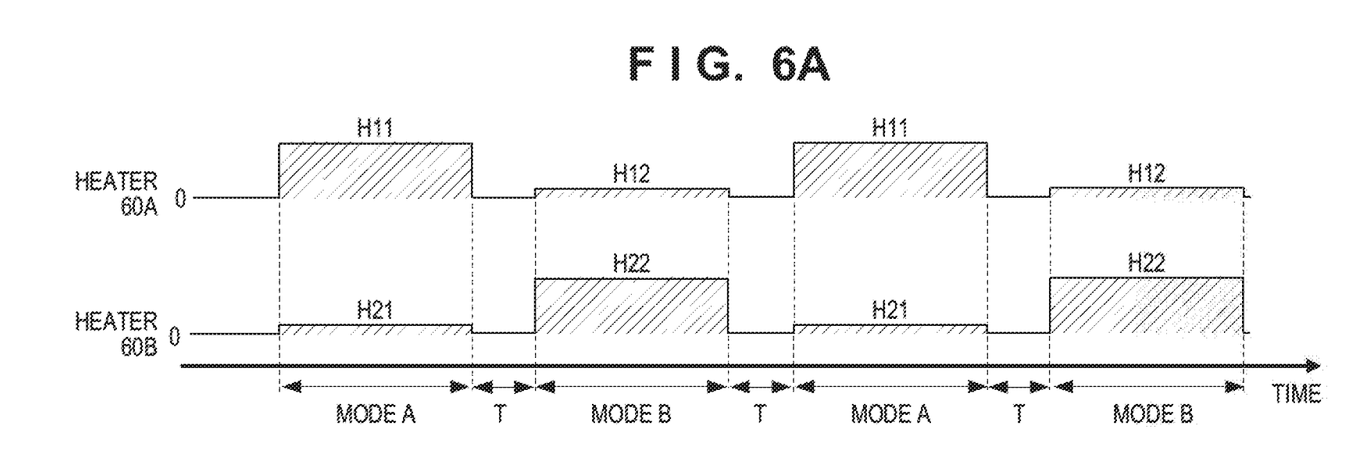
FIGS. 6A and 6B are timing charts showing driving examples of the heaters.
Figure 6B:
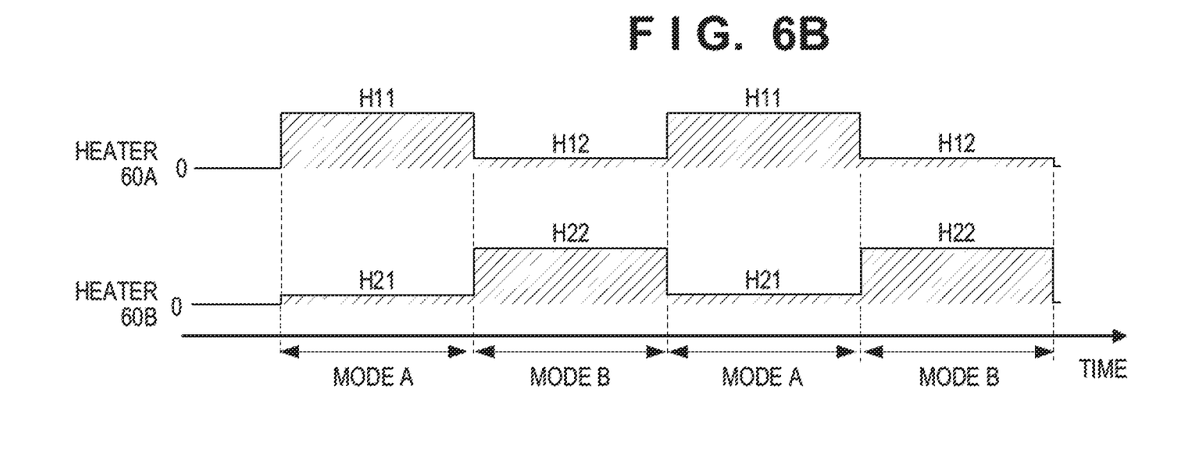

An example of double driving (S14) using the mode A and the mode B will be described next. FIGS. 6A and 6B are timing charts showing ON-OFF patterns of the heaters 60A and 60B as examples.

In both the examples shown in FIGS. 6A and 6B, the mode A and the mode B are periodically repeated. The region 11A is mainly heated in the mode A, and the region 11B is mainly heated in the mode B. When the mode B is executed after the mode A, it is possible to heat the regions 11A and 11B while suppressing an abrupt temperature change in the regions and improve the antifogging effect. When the mode A and the mode B are repeated, it is possible to promote defogging or antifogging in the regions 11A and 1B while avoiding unnecessary power consumption or unnecessary abrupt heating of the regions 11A and 11B.

The time of one mode A and the time of one mode B may equal or different. In the illustrated examples, these are the same time. This time may be a changeable time set in step S13 based on the environment recognition result in step S11, or may be a fixed time.

In the example shown in FIG. 6A, the mode A and the mode B are periodically repeated at an interval of a driving stop time T at which the driving of both the heaters 60A and 60B is stopped. When the driving stop time T is provided, it is possible to prevent the regions 11A and 11B from being unnecessarily abruptly heated. The driving stop time T may be a fixed time or a changeable time. If the driving stop time T is a changeable time, it may be set in step S13 based on the environment recognition result in step S11.

The driving stop time T can be set based on at least one of the external environment (the environment outside the vehicle) and internal environment (the environment in the vehicle) of the vehicle V.

In an environment where heat moves from the inside of the vehicle V to the outside, the driving stop time T can be set to a shorter time than in an environment where heat moves from the outside of the vehicle to the inside. More specifically, for example, if the atmospheric temperature outside the vehicle is lower than that in the vehicle, it is expected that fogging readily occurs on the window member 11. Hence, heating of the regions 11A and 11B is promoted by making the driving stop time T short. Further, an estimated heat amount moving from the inside of the vehicle V to the outside may be calculated, and the driving stop time T may be set to a time changeable by the estimated heat amount. For example, if the estimated heat amount is large, the driving stop time T is relatively made short. If the estimated heat amount is small, the driving stop time T is relatively made long.

Conversely, in an environment where heat moves from the outside of the vehicle V to the inside, the driving stop time T can be set to a longer time than in an environment where heat moves from the inside of the vehicle to the outside. More specifically, for example, if the atmospheric temperature outside the vehicle is higher than that in the vehicle, it is expected that fogging is difficult to occur on the window member 11. Hence, unnecessary heating of the regions 11A and 11B is prevented by making the driving stop time T long. Further, an estimated heat amount moving from the outside of the vehicle V to the inside may be calculated, and the driving stop time T may be set to a time changeable by the estimated heat amount. For example, if the estimated heat amount is large, the driving stop time T is relatively made long. If the estimated heat amount is small, the driving stop time T is relatively made short.

In the example shown in FIG. 6B, the driving stop time T is not present. The mode B is started at the same time as the end of the mode A, and the mode A is started at the same time as the end of the mode B. Since the driving stop time T is absent, the temperature in the regions 11A and 11B can be prevented from largely lowering due to mode switching, and the antifogging effect can be improved. In addition, heating of the regions 11A and 11B can be promoted in a short time. In a case in which fogging has already occurred, the antifogging effect can be improved.

One of the ON-OFF patterns shown in FIGS. 6A and 6B may be selected in step S13 based on the environment recognition result in step S11. As the ON-OFF pattern of the heaters 60A and 60B, a plurality of patterns including patters other than that shown in FIG. 6A or 6B may be prepared, and one of the patterns may be selected in step S13 based on the environment recognition result in step S11. As another ON-OFF pattern, for example, the mode A may be repeated at an interval of the driving stop time T. In this case as well, it is possible to promote defogging or antifogging in the regions 11A and 11B while avoiding unnecessary power consumption or unnecessary abrupt heating of the regions 11A and 11B.

Second Embodiment

The heating capabilities of heaters 60A and 60B may equal. The heating capability is, for example, the rated output of a heater. If the heating capabilities of the heaters 60A and 60B equal, in the ON-OFF pattern shown in FIG. 6A or 6B in which the heating output changes, regions 11A and 11B can be heated relatively evenly, and an even defogging or antifogging effect in the regions 11A and 11B can be obtained. In addition, identical parts can be used in the heaters 60A and 60B, and the number of part types can be decreased.

On the other hand, the heating capabilities of the heaters 60A and 60B may be different. For example, the heater 60A may have a higher heating capability than the heater 60B. Even if the driving frequency of the heater 60A is decreased, the regions 11A and 11B can be heated relatively evenly. In addition, even if only the heater 60A is driven as in step S18 of FIG. 4, the defogging/antifogging effect for the region 11B corresponding to the heater 60B can easily be obtained by heat generation of the heater 60A. The heater 60A can easily always maintain the region 11A in a satisfactory state because it corresponds to the region 11A where defogging and antifogging are required in both the manual driving mode and the automated driving mode, and the heating capability is high.

In addition, the heater 60A may have a lower heating capability than the heater 60B. Even if the driving frequency of the heater 60A is increased, it is possible to obtain the defogging or antifogging effect while preventing the regions 11A and 11B from being abruptly heated. Since the heater 60A is driven in both steps S14 and S18 of FIG. 4, and its driving frequency is high, it is possible to obtain the defogging or antifogging effect while preventing the regions 11A and 11B from being abruptly heated.

Third Embodiment

In the first embodiment, an example has been described in which when the automated driving mode is set, the detection result of the camera 31B is monitored, and when the automated driving mode is not set, the detection result of the camera 31B is not monitored. However, the detection result of the camera 31B may be monitored based on another condition. For example, in a case in which the setting of the automated driving mode is limited to traveling on an expressway, traveling on a dedicated road, or traveling at a predetermined speed or more (auto-cruise or the like), the detection result of a camera 31B may be monitored to recognize a target on condition that a vehicle V is traveling on a road where the automated driving mode can be set geographically, regardless of whether the automated driving mode is set or not. In addition, the detection result of the camera 31B may be monitored to recognize a target on another condition irrelevant to the automated driving mode.

Other Embodiments

In the above embodiments, a four-wheeled vehicle has been exemplified as the vehicle. However, the present invention can also be applied to any other type of vehicle such as a two-wheeled vehicle. In addition, a vehicle has been exemplified as the transportation apparatus. However, the present invention can also be applied to any other type of transportation apparatus such as a ship or airplane.

As the heater of the control target, heaters corresponding to the cameras 31A and 31B have been exemplified. However, the present invention can also be applied to a heater corresponding to any other type of sensor such as the LiDAR 32A and the radar 32B. In addition, the present invention can also be applied to a heater that does not correspond to a sensor.

As the target of defogging or antifogging, the regions 11A and 11B of the window member 11 that constitutes a windshield have been exemplified. However, the present invention can also be applied to another window member such as a rear window or side window.

The embodiments and detailed examples in these can appropriately be combined.

Summary of Embodiment

The above embodiments disclose at least the following embodiments.

1. According to the above embodiment, there is provided a transportation apparatus (for example, V) comprising:
    a window member (for example, 11);
    a first beating unit (for example, 60A) arranged to heat a first region (for example, 11A) of the window member;
    a second heating unit (for example, 60B) arranged to heat a second region (for example, 11B) of the window member; and
    a control unit (for example, 1, 21) configured to control driving of the first beating unit and the second beating unit,
    wherein the first region and the second region are adjacent regions, and
    the control unit performs first heating control (for example, mode A) of making a beating output of the first heating unit larger than a heating output of the second heating unit.

According to this embodiment, it is possible to provide a technique of more appropriately heating a plurality of heating target regions on the window member while avoiding unnecessary power consumption or unnecessary abrupt heating of the regions.

2. In the above embodiment,
    the control unit performs second heating control (for example, mode B) of making the heating output of the first beating unit smaller than the heating output of the second heating unit after the first heating control is continued for a predetermined time (for example, FIG. 6A, FIG. 6B).

According to this embodiment, it is possible to heat a plurality of heating target regions on the window member while suppressing an abrupt temperature change and improve the antifogging effect.

3. In the above embodiment,
    the control unit sets a driving stop time (for example, T) between the first heating control and the second heating control based on at least one of an external environment and an internal environment of the transportation apparatus, and
    in an environment in which heat moves from an inside of the transportation apparatus to an outside, the driving stop time is set to a time shorter than in an environment in which heat moves from the outside of the transportation apparatus to the inside.

According to this embodiment, it is possible to appropriately heat a plurality of heating target regions on the window member in accordance with an environment in which the transportation apparatus is placed. In addition, the driving stop time is changed in accordance with the environment in which the transportation apparatus is placed, thereby improving the antifogging effect while reducing energy concerning the first and second heating units.

4. In the above embodiment,
    the control unit starts the second heating control simultaneously with ending the first heating control, and starts the first heating control simultaneously with ending the second heating control (for example, FIG. 6B).

According to this embodiment, when switching heating control, the first and second regions can be heated without largely lowering the temperature of the regions, and the antifogging effect can be improved.

5. In the above embodiment,
    heating capabilities of the first heating unit and the second heating unit equal.

According to this embodiment, it is easy to evenly obtain the defogging/antifogging effect in the first and second regions.

6. In the above embodiment,
    the first heating unit has a higher heating capability than the second heating unit.

According to this embodiment, even if the driving frequency of the first heating unit is low, uniform antifogging performance can be obtained in the first and second regions.

7. In the above embodiment,
    the first heating unit has a lower heating capability than the second heating unit.

According to this embodiment, even if the driving frequency of the first heating unit is increased, it is possible to obtain antifogging performance while avoiding the first and second regions from being unnecessarily abruptly heated.

8. In the above embodiment,
    the apparatus further comprises:
    a first detection unit configured to detect a situation on the periphery of the transportation apparatus via the first region; and a second detection unit configured to detect the situation on the periphery of the transportation apparatus via the second region, a detection result of the first detection unit is always monitored during movement of the transportation apparatus, and a detection result of the second detection unit is monitored when a predetermined condition is satisfied during the movement of the transportation apparatus.

According to this embodiment, if the heating capability of the first heating unit is higher than the heating capability of the second heating unit, it is possible to always obtain high antifogging performance during movement of the transportation apparatus. If the heating capability of the first heating unit is lower than the heating capability of the second heating unit, it is possible to obtain antifogging performance while avoiding the first and second regions from being unnecessarily abruptly heated.

9. According to the above embodiment, there is provided a vehicle (for example, V) comprising:

a window member (for example, 11) constituting a windshield;

a first camera (for example, 31A) configured to capture a front side of the vehicle through the window member;

a second camera (for example, 31B) configured to capture the front side of the vehicle through the window member;

a first heating unit (for example, 60A) configured to heat the window member;

a second heating unit (for example, 60B) configured to heat the window member; and a control unit (for example, 1, 21) configured to control driving of the first heating unit and the second heating unit, wherein the first camera and the second camera are arranged side by side in a vehicle width direction, the first heating unit is arranged to heat a first region (for example, 11A) of the window member overlapping an image capturing range of the first camera, the second heating unit is arranged to heat a second region (for example, 11B) of the window member overlapping an image capturing range of the second camera, and the control unit performs first heating control (for example, mode A) of making a heating output of the first heating unit larger than a heating output of the second heating unit.

According to this embodiment, it is possible to provide a technique of more appropriately heating a plurality of heating target regions on the window member while avoiding unnecessary power consumption or unnecessary abrupt heating of the regions.

The invention is not limited to the foregoing embodiments, and various variations/changes are possible within the spirit of the invention.

What is claimed is:

1. A transportation apparatus comprising:
a window member;
a first heating unit arranged to heat a first region of the window member;
a second heating unit arranged to heat a second region of the window member; and
a control unit configured to control driving of the first heating unit and the second heating unit,
wherein the first region and the second region are adjacent regions, and
the control unit performs first heating control of making a heating output of the first heating unit larger than a heating output of the second heating unit, wherein the control unit performs second heating control of making the heating output of the first heating unit smaller than the heating output of the second heating unit after the first heating control is continued for a predetermined time, wherein the control unit sets a driving stop time between the first heating control and the second heating control based on an external environment and/or an internal environment of the transportation apparatus, and in an environment in which heat moves from an inside of the transportation apparatus to an outside, the driving stop time is set to a time shorter than in an environment in which heat moves from the outside of the transportation apparatus to the inside.

2. The apparatus according to claim 1, wherein heating capabilities of the first heating unit and the second heating unit equal.

3. The apparatus according to claim 1, wherein the first heating unit has a higher heating capability than the second heating unit.

4. The apparatus according to claim 1, wherein the first heating unit has a lower heating capability than the second heating unit.

5. The apparatus according to claim 1,
wherein the apparatus is a vehicle,
the window member constitutes a windshield,
the apparatus further comprises:
a first camera configured to capture a front side of the vehicle through the window member; and
a second camera configured to capture the front side of the vehicle through the window member,
the first heating unit is arranged to heat the first region of the window member overlapping an image capturing range of the first camera, and
the second heating unit is arranged to heat the second region of the window member overlapping an image capturing range of the second camera.

6. A transportation apparatus comprising:
a window member;
a first heating unit arranged to heat a first region of the window member;
a second heating unit arranged to heat a second region of the window member;
a control unit configured to control driving of the first heating unit and the second heating unit;
a first detection unit configured to detect a situation on the periphery of the transportation apparatus via the first region; and
a second detection unit configured to detect the situation on the periphery of the transportation apparatus via the second region,
wherein the first region and the second region are adjacent regions,
the control unit performs first heating control of making a heating output of the first heating unit larger than a heating output of the second heating unit,
the first heating unit has a higher heating capability than the second heating unit,
a detection result of the first detection unit is always monitored during movement of the transportation apparatus, and
a detection result of the second detection unit is monitored when a predetermined condition is satisfied during the movement of the transportation apparatus.

7. The apparatus according to claim 6,
wherein the apparatus is a vehicle,
the window member constitutes a windshield, the first detection unit is a first camera configured to capture a front side of the vehicle through the window member, the second detection unit is a second camera configured to capture the front side of the vehicle through the window member;

the first heating unit is arranged to heat the first region of the window member overlapping an image capturing range of the first camera, and the second heating unit is arranged to heat the second region of the window member overlapping an image capturing range of the second camera.

8. The apparatus according to claim 6, wherein the control unit performs second heating control of making the heating output of the first heating unit smaller than the heating output of the second heating unit after the first heating control is continued for a predetermined time, and wherein the control unit starts the second heating control simultaneously with ending the first heating control, and starts the first heating control simultaneously with ending the second heating control.

* * * * *